(12) United States Patent
Hui et al.

(10) Patent No.: US 8,923,422 B2
(45) Date of Patent: Dec. 30, 2014

(54) REDUCING THE IMPACT OF SUBCARRIER QUALITY EVALUATION

(75) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 13/563,423

(22) Filed: Jul. 31, 2012

(65) Prior Publication Data

US 2013/0251053 A1 Sep. 26, 2013

Related U.S. Application Data

(60) Provisional application No. 61/614,975, filed on Mar. 23, 2012.

(51) Int. Cl.
*H04L 27/28* (2006.01)

(52) U.S. Cl.
USPC ............................................. 375/260

(58) Field of Classification Search
CPC ............ H04L 27/2601; H04L 27/2602; H04L 27/2608; H04L 27/2646; H04L 7/066
USPC ............................................. 375/260
See application file for complete search history.

(56) References Cited

U.S. PATENT DOCUMENTS

| 6,072,773 A | 6/2000 | Fichou et al. |
| 6,118,791 A | 9/2000 | Fichou et al. |
| 6,192,248 B1 | 2/2001 | Solondz |
| 6,424,624 B1 | 7/2002 | Galand et al. |
| 6,934,340 B1 | 8/2005 | Dollard |
| 7,327,697 B1 | 2/2008 | Friday et al. |
| 7,352,688 B1 | 4/2008 | Perahia et al. |

(Continued)

FOREIGN PATENT DOCUMENTS

| EP | 1388954 A2 | 2/2004 |
| GB | 2443009 A | 4/2008 |
| WO | WO-0239631 A1 | 5/2002 |
| WO | WO-2008144323 A1 | 11/2008 |

OTHER PUBLICATIONS

Rummery, et al., "Notification of Transmittal of the International Search Report and the Written Opinion of the International Searching Authority, or the Declaration", Patent Cooperation Treaty, International Application No. PCT/US2013/033485, mailed Nov. 8, 2013, 14 pages, European Patent Office, Rijswijk, The Netherlands.

(Continued)

*Primary Examiner* — Kevin Kim
(74) *Attorney, Agent, or Firm* — Parker Ibrahim & Berg LLC; James M. Behmke; Stephen D. LeBarron

(57) ABSTRACT

In one embodiment, a device may select, based on an optimal tone map, a particular subcarrier for use when transmitting a data frame, the data frame to serve as a tone map request (TMREQ). The device may then populate one or more unused quality subcarriers of the TMREQ data frame other than the particular subcarrier with a well-known bit sequence, and transmits the TMREQ data frame to a receiving device to cause the receiving device to evaluate transmission quality of the one or more unused quality subcarriers based on the well-known bit sequence.

21 Claims, 7 Drawing Sheets

(56) References Cited

U.S. PATENT DOCUMENTS

| | | | |
|---|---|---|---|
| 7,352,718 | B1 | 4/2008 | Perahia et al. |
| 7,359,311 | B1 | 4/2008 | Paranjpe et al. |
| 7,466,981 | B1 | 12/2008 | Abdelhamid et al. |
| 7,593,356 | B1 | 9/2009 | Friday et al. |
| 7,616,604 | B2 | 11/2009 | Abdelhamid et al. |
| 7,724,650 | B2 | 5/2010 | Karam |
| 7,787,897 | B2 | 8/2010 | Banh et al. |
| 7,884,763 | B2 | 2/2011 | Na et al. |
| 7,925,268 | B2 | 4/2011 | Sanders et al. |
| 7,995,525 | B1 | 8/2011 | Perahia et al. |
| 8,031,786 | B2 | 10/2011 | Wang et al. |
| 8,040,831 | B2 | 10/2011 | Kurtz et al. |
| 8,068,552 | B2 | 11/2011 | Wang et al. |
| 8,073,489 | B2 | 12/2011 | Liu et al. |
| 8,082,347 | B2 | 12/2011 | Abdelhamid et al. |
| 8,130,875 | B2 | 3/2012 | Liu et al. |
| 8,134,503 | B2 | 3/2012 | Na et al. |
| 8,145,272 | B2 | 3/2012 | Wang et al. |
| 8,218,677 | B2 | 7/2012 | Jin et al. |
| 8,218,969 | B2 | 7/2012 | Forghieri et al. |
| 8,249,509 | B2 | 8/2012 | Wang et al. |
| 8,374,105 | B1 | 2/2013 | Perahia et al. |
| 8,379,524 | B1 | 2/2013 | Jacobs et al. |
| 8,411,807 | B1 | 4/2013 | Rangarajan et al. |
| 8,416,802 | B2 | 4/2013 | Jin et al. |
| 2005/0180515 | A1* | 8/2005 | Orihashi et al. .............. 375/260 |
| 2006/0294246 | A1 | 12/2006 | Stieglitz et al. |
| 2007/0026868 | A1 | 2/2007 | Schulz et al. |
| 2009/0190535 | A1 | 7/2009 | Hassan et al. |
| 2009/0310692 | A1 | 12/2009 | Kafle et al. |
| 2010/0142540 | A1 | 6/2010 | Matheney et al. |
| 2010/0162329 | A1 | 6/2010 | Ford et al. |
| 2011/0026630 | A1 | 2/2011 | Stager et al. |
| 2011/0236013 | A1 | 9/2011 | Gazzola et al. |
| 2013/0077469 | A1* | 3/2013 | Ma et al. ....................... 370/210 |
| 2013/0215885 | A1* | 8/2013 | Vijayasankar et al. ....... 370/389 |

OTHER PUBLICATIONS

Rummery, et al., "Notification of Transmittal of the International Search Report and the Written Opinion of the International Searching Authority, or the Declaration", Patent Cooperation Treaty, International Application No. PCT/US2013/033522, mailed Nov. 8, 2013, 15 pages, European Patent Office, Rijswijk, The Netherlands.

Pettersson, et al., "Invitation to pay Additional Fees, and Where Applicable, Protest Fee", Patent Cooperation Treaty, PCT/US2013/033485, mailed Aug. 20, 2013, 5 pages, European Patent Office, Rijswijk, Netherlands.

Pettersson, et al., "Notification of Transmittal of the International Search Report and the Written Opinion of the International Searching Authority, or the Declaration", Patent Cooperation Treaty, International Application No. PCT/US2013/033504, mailed Aug. 20, 2013, 9 pages, European Patent Office, Rijswijk, Netherlands.

Pettersson, et al., "Invitation to pay Additional Fees, and Where Applicable, Protest Fee", Patent Cooperation Treaty, PCT/US2013/033522, mailed Aug. 20, 2013, 5 pages, European Patent Office, Rijswijk, Netherlands.

Xu, et al., "Hierarchical Opportunistic Scheduling in Multi-Service OFDMA Networks", International Conference on Wireless Communications, Networking and Mobile Computing, Sep. 2007, pp. 2004-2007, Institute of Electrical and Electronics Engineers, Piscataway, New Jersey.

Hui, et al., "Techniques for Use in Orthogonal Frequency Division Multiplexing (OFDM) Communication Networks", U.S. Appl. No. 61/614,975, filed Mar. 23, 2012, 48 pages.

Jain, et al., "Practical, Real-Time, Full Duplex Wireless", MobiCom '11, Sep. 19-23, 2011, 12 pages, Association for Computing Machinery, Las Vegas, Nevada.

Winter; et al., "RPL: IPv6 Routing Protocol for Low-Power and Lossy Networks", Internet Engineering Task Force, Request for Comments 6550, Mar. 2012, 157 pages.

* cited by examiner

REDUCING THE IMPACT OF SUBCARRIER QUALITY EVALUATION

RELATED APPLICATION

The present application claims priority to U.S. Provisional Patent Application Ser. No. 61/614,975, filed Mar. 23, 2012, entitled TECHNIQUES FOR USE IN ORTHOGONAL FREQUENCY DIVISION MULTIPLEXING (OFDM) COMMUNICATION NETWORKS, by Hui et al., the contents of which are hereby incorporated by reference.

TECHNICAL FIELD

The present disclosure relates generally to communication networks, and, more particularly, to communication networks employing orthogonal frequency division multiplexing (OFDM).

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

To help provide greater throughput and robustness, Orthogonal Frequency Division Multiplexing (OFDM) utilizes additional bandwidth by allowing transmission of multiple data streams across orthogonal subcarriers simultaneously to increase throughput. Adjusting the number of subcarriers and code-rate can vastly change the effective throughput of the link. In addition, Adaptive Tone Mapping is a process that dynamically selects which subcarriers and coding parameters are used when transmitting a data frame. The goal of Adaptive Tone Mapping is to maximize throughput and minimize channel utilization by only transmitting on usable subcarriers and optimizing the code-rate without sacrificing robustness. Current techniques for selection, allocation, and utilization of subcarriers, however, offer room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
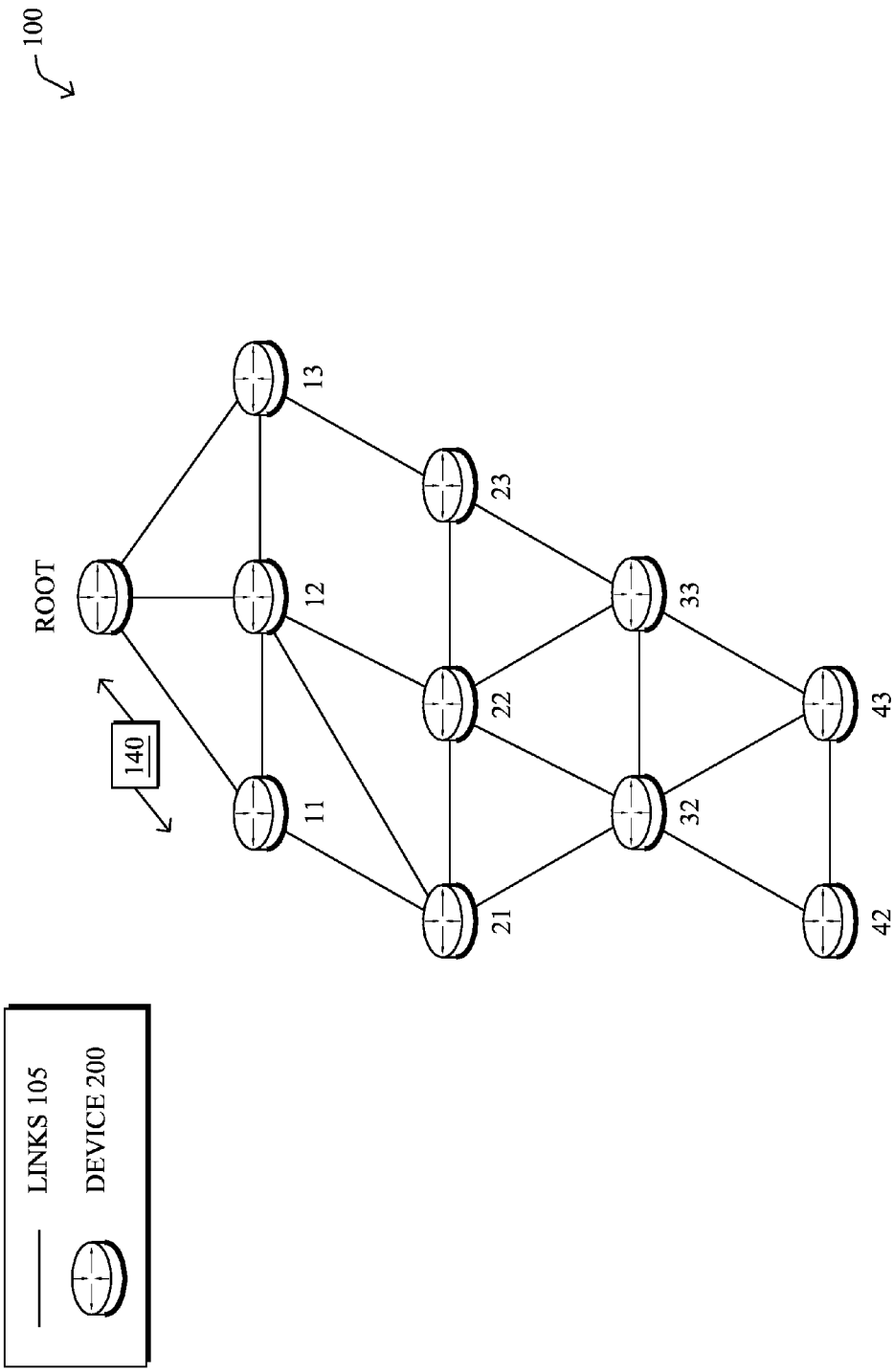
FIG. 1 illustrates an example communication network.

According to one or more embodiments of the disclosure, a device may select, based on an optimal tone map, a particular subcarrier for use when transmitting a data frame, the data frame to serve as a tone map request (TMREQ). The device may then populate one or more unused quality subcarriers of the TMREQ data frame other than the particular subcarrier with a well-known bit sequence, and transmits the TMREQ data frame to a receiving device to cause the receiving device to evaluate transmission quality of the one or more unused quality subcarriers based on the well-known bit sequence.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
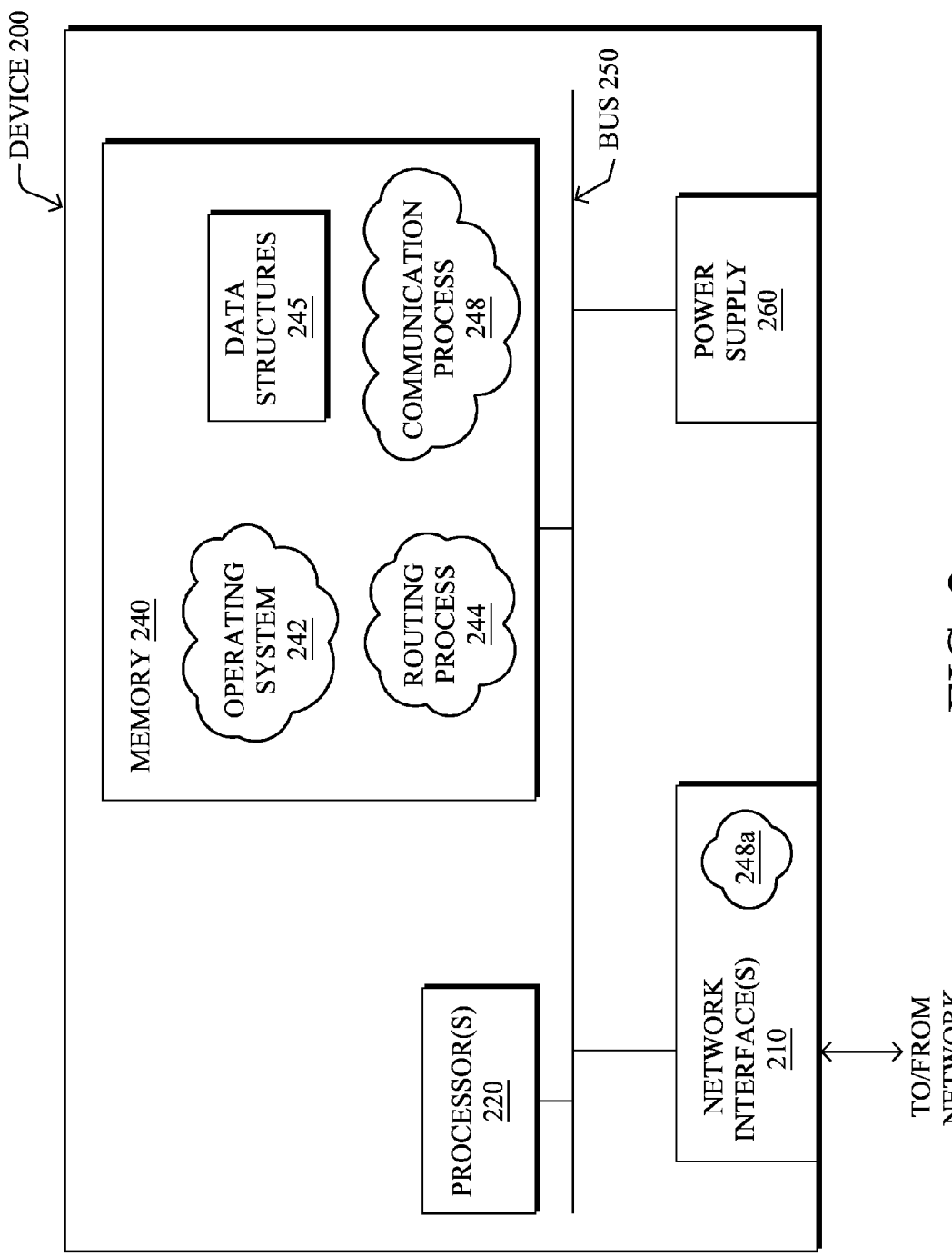
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244 (for routing devices), and a communication process 248, as described herein. Note that while the communication process 248 is shown in centralized memory 240, alternative embodiments provide for the process to be specifically operated within the network interfaces 210, such as a component of the MAC or PHY layer of the interface.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 (on routing-capable devices) contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route is request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example proactive routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

As noted, though, LLNs face a number of communication challenges:
1) LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g. transmissions from other transceivers) to months (e.g. seasonal changes of outdoor environment).
2) Low-cost and low-power designs limit the capabilities of the transceiver. In particular, LLN transceivers typically provide low throughput. Furthermore, LLN transceivers typically support limited link margin, making the effects of interference and environmental changes visible to link and network protocols.
3) Shared-media communication networks, such as power-line communication (PLC) networks (a type of communication over power-lines), provide an enabling technology for networking communication and can be used for example in AMI networks, and are also useful within home and buildings. Interestingly, PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

To help provide greater throughput and robustness, Orthogonal Frequency Division Multiplexing (OFDM) is being standardized by IEEE 802.15.4 g, HomePlug, and IEEE P1901.2. OFDM utilizes additional bandwidth by allowing transmission of multiple data streams across orthogonal subcarrier simultaneously to increase throughput. With optimal erasure codes (e.g., Reed-Solomon), a data frame can be coded across multiple subcarriers to tolerate erasures across different subcarriers and even the complete loss of an individual subcarrier during a packet transmission. In addition, repetition codes may also be applied to provide extremely robust communication, albeit at a very low throughput (known as "ROBO" mode in HomePlug and IEEE P1901.2). Adjusting the number of subcarriers and code-rate can vastly change the effective throughput of the link. For IEEE P1901.2, the effective throughput can range from 2.4 kbps to 34.2 kbps, notably more than an order of magnitude difference.

In addition, Adaptive Tone Mapping is a process that dynamically selects which subcarriers and coding parameters use when transmitting a data frame. The goal of Adaptive Tone Mapping is to maximize throughput and minimize channel utilization by only transmitting on usable subcarriers and optimizing the code-rate without sacrificing robustness. HomePlug and IEEE P1901.2 currently provides mechanisms to send a Tone Map Request (TMREQ) to a neighboring device. HomePlug and IEEE P1901.2 currently require that all TMRs be sent using all available subcarriers to allow the receiver to evaluate the quality on each subcarrier. The quality may be represented as one or more of signal-to-noise-ratio (SNR), bit-error rate, frame-error rate, etc. Upon receiving a TMREQ, a device evaluates the quality of each subcarrier and includes them in a Tone Map Reply (TMREP). Devices maintain a neighbor table indicating the quality of each subcarrier, allowing them to perform tone mapping for subsequent transmissions to optimize throughput.

Current techniques for selection, allocation, and utilization of subcarriers, however, offer room for improvement. Therefore, various techniques are hereinafter shown and described for use with OFDM-based communication networks.

Illustratively, the techniques described herein may be performed by hardware, software, and/or firmware, such as in accordance with the communication process 248, which may contain computer executable instructions executed by the processor 220 (or independent processor of interfaces 210) to perform functions relating to the novel techniques described herein. For example, the techniques herein may be treated as extensions to conventional communication protocols, such as the various protocols that utilize OFDM communication (e.g., wireless protocols, PLC protocols, or other shared media protocols), and as such, may be processed by similar components understood in the art that execute those protocols, accordingly.

Reducing the Impact of Subcarrier Quality Evaluation

The Adaptive Tone Mapping process, as specified by P1901.2, is an expensive process. P1901.2 requires devices to send TMREQ frames utilizing all subcarriers in ROBO mode (which combines Reed-Solomon and repetition coding) and limits overall throughput to 2.4 to 5.6 kbps. Using ROBO mode has generally been necessary since the data is spread across all subcarriers, some of which may experience significant fading. While any data frame may be configured to serve as a TMREQ frame, in practice, it is better to use small dedicated control messages to reduce the overall communication overhead. Unfortunately, requiring the use of dedicated control messages also adds communication overhead.

Existing OFDM systems (e.g., HomePlug and P1901.2) specify an Adaptive Tone Mapping mechanism that can have significant impact on system performance. In particular, they require either explicit control messages or piggyback on data messages to evaluate the quality of each subcarrier. Using explicit control messages allows the control messages to be very small, but increases the messaging load on the network. Existing systems that piggyback on data messages (e.g., HomePlug and P1901.2) significantly increase the overhead of sending the data frame by requiring transmission across all available subcarriers (some of which may experience deep fading).

The techniques herein, however, significantly reduce the impact of the Adaptive Tone Mapping process by allowing devices to turn any data frame into a TMREQ without significantly increasing the transmission overhead. The techniques herein also allow subcarriers to be evaluated individually in time.

Specifically, according to one or more embodiments of the disclosure as described in detail below, the techniques herein reduce the impact of TMREQ messages that drive the Tone Mapping process by allowing devices to turn any existing data frame into a TMREQ. In particular, the techniques accomplish this by sending a well-known bit sequence or expanded coded data on unused subcarriers so that a receiving device can evaluate the subcarrier quality. Devices may also maintain the quality age for each subcarrier independently, allowing them to dynamically adapt and distribute the use of inactive subcarriers when sending TMREQs. This is in contrast to P1901.2, which requires significant overhead to send a TMREQ utilizing all available subcarriers simultaneously.

Operationally, the techniques herein provide a mechanism that allows Tone Map Request (TMREQ) messages to utilize/piggyback on existing data frames with as little communication overhead as possible. As described above, TMREQ transmissions must utilize all subcarriers such that the receiving devices can record SNR information for each subcarrier relative to the target transmitter. P1901.2 takes a conservative approach by requiring data frames sent as TMREQ messages to be coded across all subcarriers using ROBO mode, which significantly increases the communication overhead for the data frame.

===Minimizing Overhead of Piggybacking TMREQ on Data Messages===

A first aspect of the techniques herein involves minimizing the overhead of piggybacking Tone Map Requests on data messages.

Figure 3:
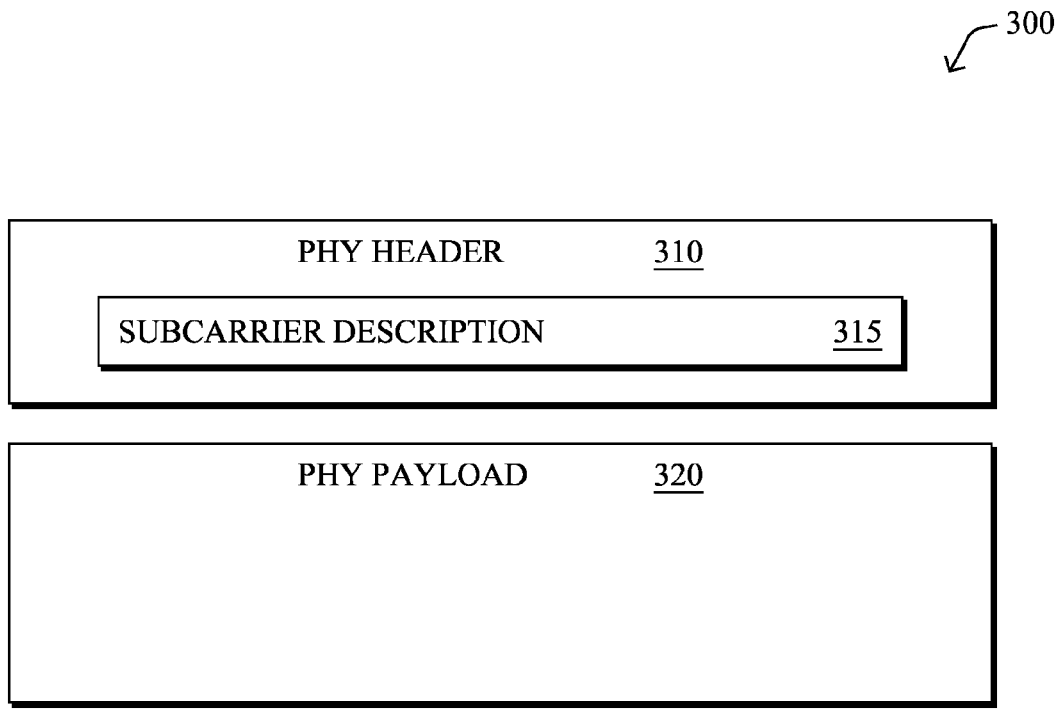
FIG. 3 illustrates an example of a message.
Figure 4:
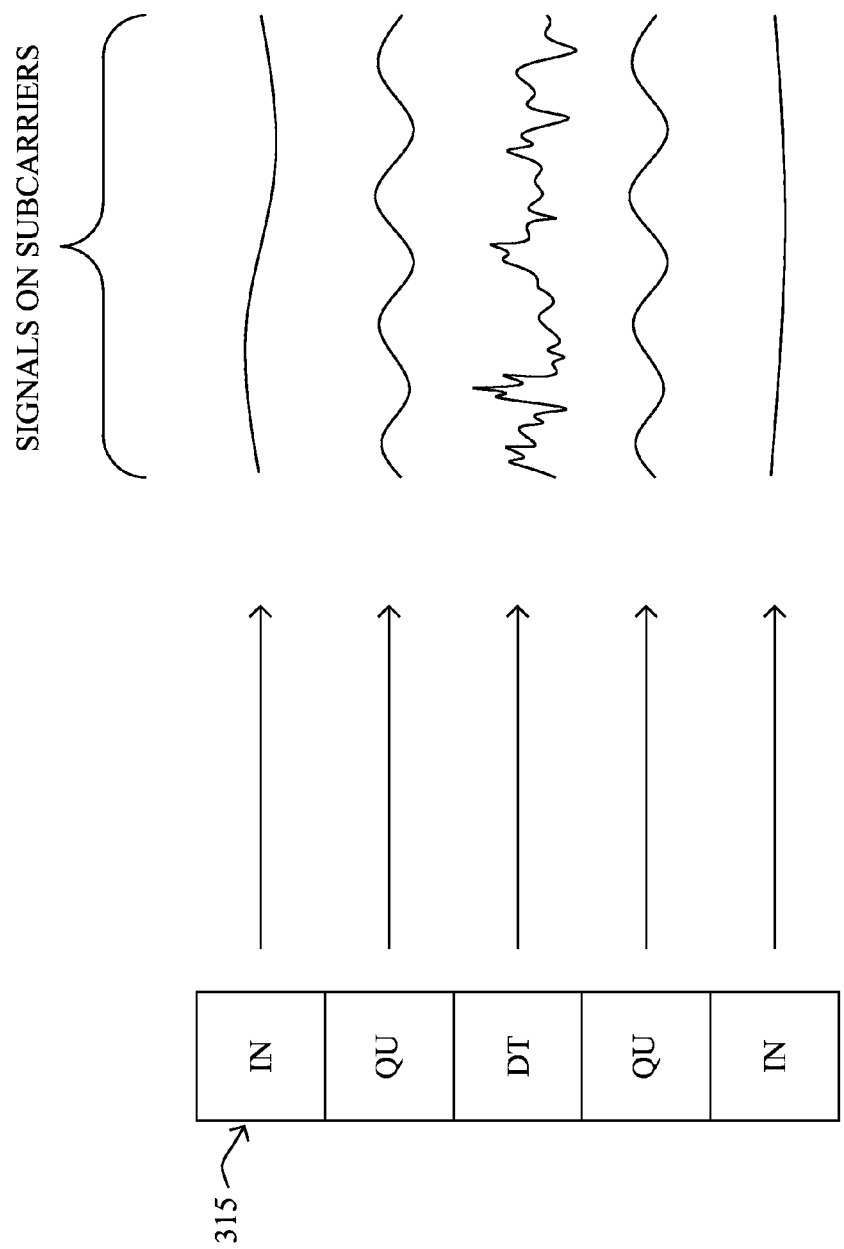
FIG. 4 illustrates an example of subcarrier transmission.

In one embodiment, devices select the optimal tone map when sending a data frame as usual. For data frames that serve as a TMREQ, devices may additionally send a signal with a well-known bit-pattern on unused subcarriers so that the receiver can evaluate the quality of those subcarriers. The existing PHY header specified in P1901.2 includes a bit-mask indicating what subcarriers are actively carrying data and whether the frame also serves as a TMREQ. However, the bit-mask does not indicate what subcarriers are being used to transmit a well-known bit-pattern for quality assessment. Instead, as shown in FIG. 3, the techniques herein augment the PHY header 310 with a newly defined subcarrier description field 315 in TMREQ messages 300 (with a PHY payload 320). As shown in FIG. 4, the new field 315 contains two bits for each subcarrier and identifies the use of the subcarrier in the current transmission (inactive or "IN", data or "DT", and quality or "QU"). (Notably, the number of subcarriers and their use is merely a simplified example, not meant to limit the scope of the embodiments herein.)

A device does not transmit anything on inactive subcarriers. The receiver evaluates the quality of both data and quality subcarriers. The difference is that quality subcarriers do not carry any portion of the existing data frame. Unlike P1901.2, this approach sends the data frame using the same parameters as if it was a normal data frame transmission. By serving as a TMREQ, we add a small handful of bits to the Tone Map to indicate what active subcarriers are carrying real data, increasing the transmission time by an negligible amount. The disadvantage of this approach, however, is that the devices do not take advantage the additional channels to carry actual data.

In another embodiment, devices can alter the code-rate when sending a data frame across more subcarriers than what the optimal parameters call for. The code-rate specifies how much redundant information is included in the coding scheme. Using optimal erasure codes, we can expand the number of subcarriers from X to Y and reduce the code-rate by X/Y without increasing the transmission time. This is because we now have a raw bit-rate increase of Y/X with the additional channels. This approach has the added benefit of marginally increasing the communication robustness (receiving any valid data on the additional subcarriers will help decode the data frame). However, unlike the prior approach, this approach does not send a well-known bit-pattern on the additional subcarriers. As a result, while devices can still compute metrics such as SNR and frame-error rate, computing the bit-error rate is more challenging.

===Managing Quality Age for Subcarriers Independently===

A second aspect of the techniques herein involves managing the quality age for the different subcarriers independently. Recall that the existing TMREQ in P1901.2 requires transmission on all available subcarriers. When not sending a TMREQ, devices may not utilize certain subcarriers and thus quality information for those subcarriers becomes stale. As a result, P1901.2 requires devices to maintain a TMREQ age in the neighbor table and, whenever sending a data message, if the TMREQ age expires, the data message is sent as a TMREQ.

With the techniques herein, a device maintains a separate TMREQ age for each subcarrier independently. A newly defined TMREP message sent in response then only includes information for subcarriers that had transmission activity. When receiving a TMREP message, the device resets the TMREQ age for each of the subcarriers. When the TMREQ age expires, the device can choose whether or not to update the subcarrier quality information about issuing a TMREQ that utilizes that subcarrier.

By managing the TMREQ age for each subcarrier independently, the techniques herein allow a device to distribute the subcarrier quality evaluation over time. In particular, rather than requiring a TMREQ to evaluate the quality of all subcarriers simultaneously in one shot, the device may choose to evaluate only a subset of the subcarriers in a TMREQ. In doing so, the device can choose to leave some of the subcarriers available for neighboring devices to utilize. This is especially important in mesh networking, where hidden terminals significantly increase the likelihood of collisions between 2-hop neighbors. By not transmitting data on a subcarrier, the device will not cause any interference for other transmissions occurring on that subcarrier.

In one embodiment, a simplified implementation does not actually need to maintain separate age timers for each subcarrier. Instead, it could simply set a "refresh" flag for each of the subcarriers and reset the "refresh" flag whenever the device chooses to refresh the subcarrier.

In another embodiment, maintaining independent age timers for each subcarrier allows a device to also dynamically determine the period at which to refresh the information. The period may be adjusted based on observed properties of the subcarrier and interference and/or application-requirements on the responsiveness of reacting to changes in subcarrier quality.

In yet another embodiment, the dynamic aging value is based on feedback. When the receiver detects that the SNR is fast changing (e.g., looking at the second derivative of the SNR value) compared to the latest returned value it could set a flag thus triggering the use of data frame as TMREQ more often for that subcarrier.

Figure 5A:
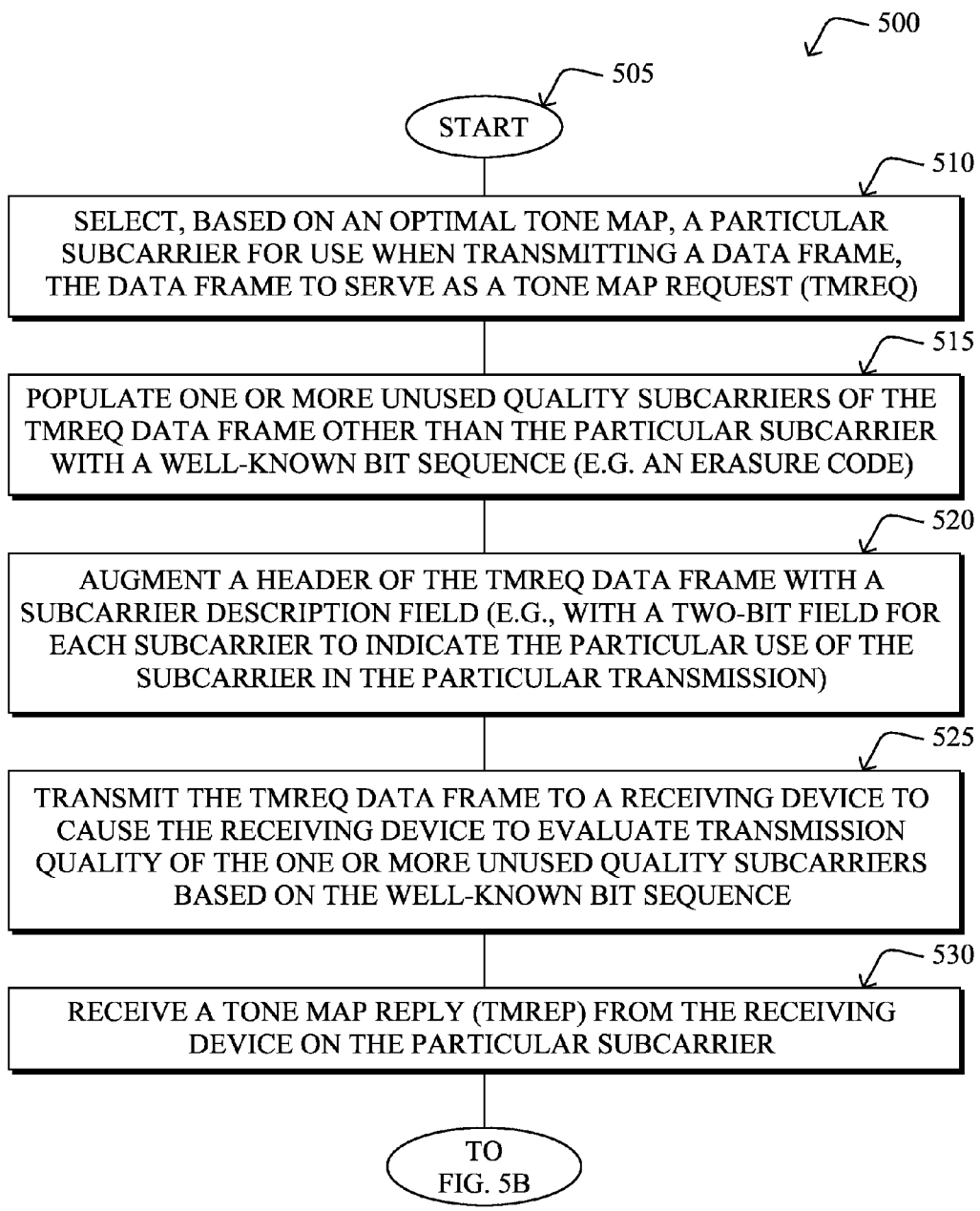
FIGS. 5A-5B illustrate an example simplified procedure for reducing the impact of subcarrier quality evaluation in an OFDM-based communication network, particularly from the perspective of a transmitting device.
Figure 5B:
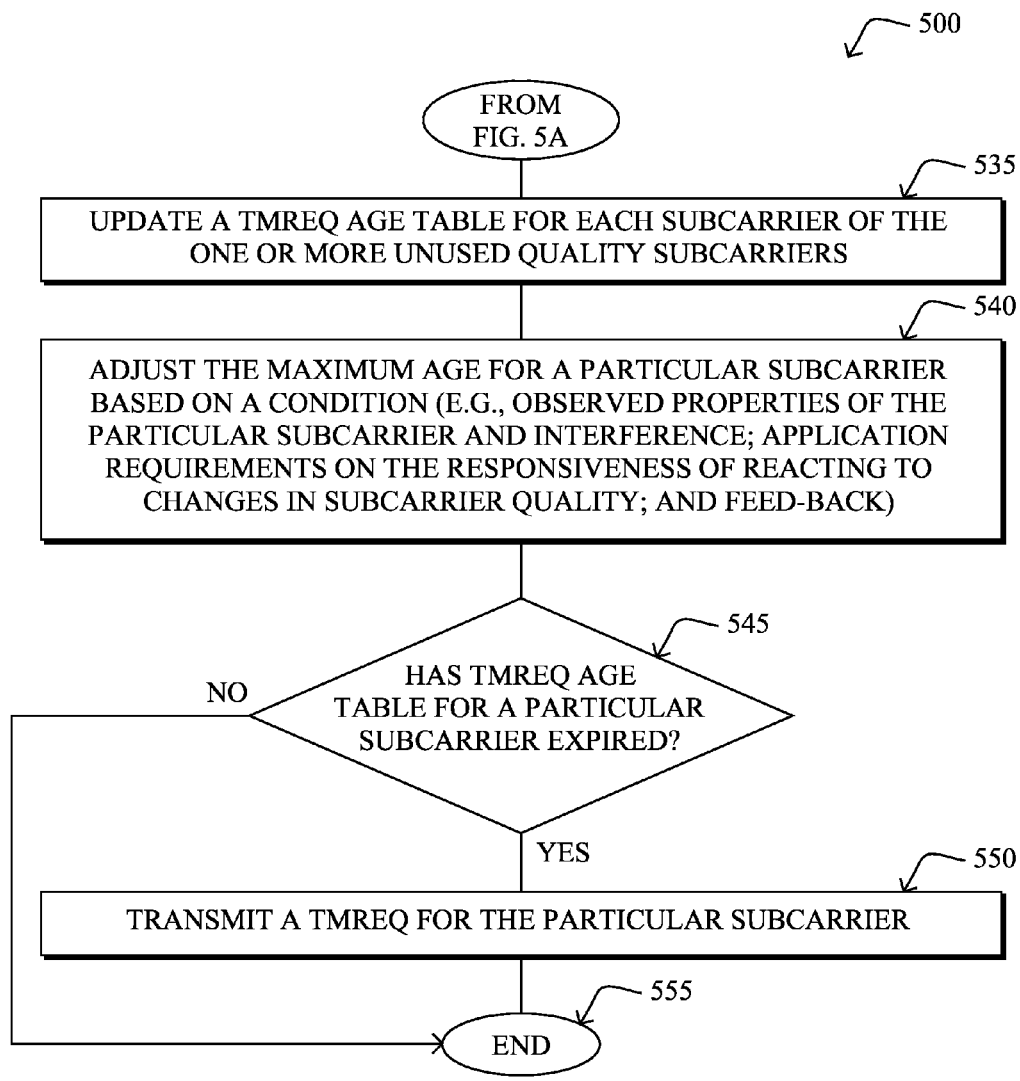

FIGS. 5A-5B illustrate an example simplified procedure 500 for reducing the impact of subcarrier quality evaluation in an OFDM-based communication network in accordance with one or more embodiments described herein, particularly from the perspective of a transmitting device. The procedure 500 may start at step 505, and continues to step 510, where, as described in greater detail above, a transmitting device selects, based on an optimal tone map, a particular subcarrier for use when transmitting a data frame, the data frame to serve as a tone map request (TMREQ). As such, in step 515 the transmitting device may populate one or more unused quality subcarriers of the TMREQ data frame other than the particular subcarrier with a well-known bit sequence (e.g. an erasure code) as detailed above, and may then augment a header of the TMREQ data frame with a subcarrier description field 315 in step 520. For example, as noted above, the header may be augmented with a two-bit field for each subcarrier to indicate the particular use of the subcarrier in the particular transmission.

In step 525, the transmitting device may transmit the TMREQ data frame to a receiving device to cause the receiving device to evaluate transmission quality of the one or more unused quality subcarriers based on the well-known bit sequence. Next, in step 530, the transmitting device may receive a tone map reply (TMREP) from the receiving device on the particular subcarrier, and as mentioned above, may update a TMREQ age table for each subcarrier of the one or more unused quality subcarriers in step 535. In certain embodiments, in step 540 the transmitting device may adjust the maximum age for a particular subcarrier based on a condition (e.g., observed properties of the particular subcarrier and interference; application requirements on the responsiveness of reacting to changes in subcarrier quality; and feedback). If the TMREQ age table for a particular subcarrier has expired in step 545, then in step 550 the transmitting device may transmit another TMREQ for the particular subcarrier, as described above. The procedure may illustratively end in step 555.

Figure 6:
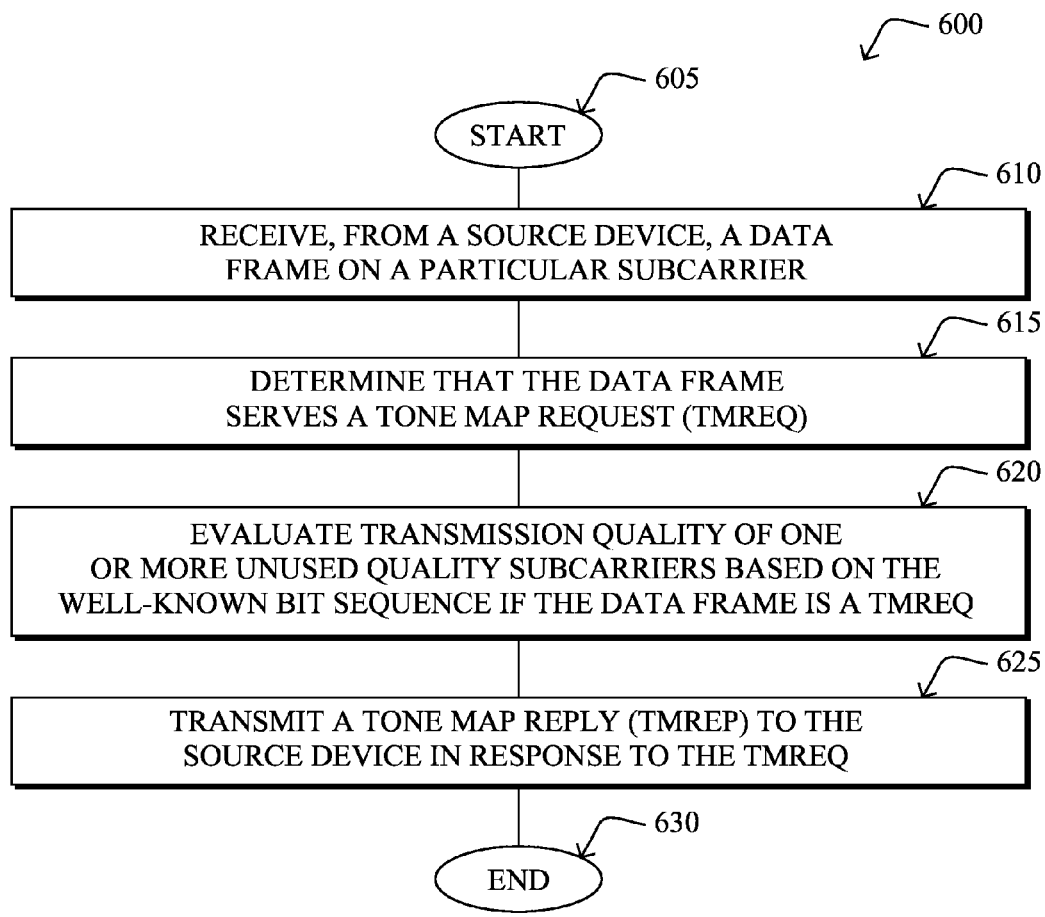
FIG. 6 illustrates an example simplified procedure for reducing the impact of subcarrier quality evaluation in an OFDM-based communication network, particularly from the perspective of a receiving device.

In addition, FIG. 6 illustrates an example simplified procedure 600 for reducing the impact of subcarrier quality evaluation in an OFDM-based communication network in accordance with one or more embodiments described herein, particularly from the perspective of a receiving device. The procedure 600 may start at step 605, and continues to step 610, where, as described in greater detail above, the receiving device may receive, from a source device (transmitting device), a data frame on a particular subcarrier. As such, in step 615 the receiving device may determine whether the data frame serves a tone map request (TMREQ), and if so, then in step 620 evaluates transmission quality of one or more unused quality subcarriers based on the well-known bit sequence. In response to the TMREQ, the receiving device may transmit a tone map reply (TMREP) to the source device in step 625, and the procedure 600 may illustratively end in step 630.

It should be noted that while certain steps within procedures 500-600 may be optional as described above, the steps shown in FIGS. 5A-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, reduce the impact of subcarrier quality evaluation in an OFDM-based communication network. In particular, the techniques herein significantly reduce the impact of sending a Tone Mapping Request message to perform Adaptive Tone Mapping in a OFDM-based system by adding special encoding to data frames per subcarrier, rather than sending out individual TMREQ messages. Reducing the impact of sending a TMREQ is critical in a highly resource-constrained environment, such as P1901.2, and increases overall throughput and reduces latency. Being able to distribute the evaluation of inactive subcarriers across time is also beneficial because it allows other transmissions to occur simultaneously, reducing overall communication latency.

Notably, as described herein data messages marked as a TMREQ may utilize a wider bandwidth signal to assess the quality on additional subcarriers. As compared to P1901.2, the techniques herein indicate what subcarriers are actually used to transmit real data as opposed to dummy data and what subcarriers are inactive. In doing so, the transmitter may utilize transmit parameters that allow higher bit-rates. In contrast, P1901.2 does not provide any such indication. In particular, P1901.2 requires utilizing all available subcarriers to transmit data messages marked as a TMREQ. As a result, P1901.2 also requires data messages serving as TMREQ to utilize ROBO mode (which maximizes the coding redundancy and minimizes the bit-rate of the modulated signal) to overcome the challenges of utilizing subcarriers with poor quality. P1901.2 assumes that only one device has access to the media at a time and all communication from the same device or different devices happens serially, using CSMA-CA.

In addition, though one advantage of P1901.2 is that TMREQ messages allow the receiver to obtain quality information for all subcarriers with each and every TMREQ reception, a TMREQ transmission consumes significant channel capacity because it must be sent across all subcarriers using ROBO mode. The techniques herein, however, (1) utilize only known good subcarriers to transmit data and (2) pick a small number (possibly one) to evaluate additional subcarriers. As a result, the TMREQ message will have a shorter transmission time and use fewer subcarriers. The latter provides opportunities for other devices to utilize those subcarriers. In a mesh networking environment, the hidden-terminal problem can be significant and avoiding use of subcarriers when possible also helps reduce the impact of hidden terminals.

While there have been shown and described illustrative embodiments of techniques for use with OFDM-based communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   selecting, based on an optimal tone map, a particular subcarrier for use when transmitting a data frame, the data frame to serve as a tone map request (TMREQ) data frame;
   populating one or more unused quality subcarriers of the TMREQ data frame other than the particular subcarrier with a well-known bit sequence, wherein the TMREQ data frame indentifying a use of each subcarrier during transmission; and
   transmitting the TMREQ data frame to a receiving device to cause the receiving device to evaluate transmission quality of the one or more unused quality subcarriers based on the well-known bit sequence.

2. The method as in claim 1, further comprising:
   receiving a tone map reply (TMREP) from the receiving device on the particular subcarrier.

3. The method as in claim 1, further comprising:
   augmenting a header of the TMREQ data frame with a subcarrier description field.

4. The method as in claim 3, wherein the subcarrier description field is augmented by a two-bit field for each subcarrier to indicate the use of the subcarrier in the particular transmission.

5. The method as in claim 4, wherein the two-bit field is used to describe a condition selected from the group consisting of: inactive subcarrier for subcarriers not transmitted; data subcarrier for the particular subcarrier transmitting the data frame; and
   quality subcarrier for the one or more unused quality subcarriers.

6. The method as in claim 1, wherein the well-known bit pattern is an erasure code.

7. The method as in claim 1, further comprising:
   altering a code-rate of the data frame to adjust an amount of redundant information included in the well-known bit sequence.

8. The method as in claim 1, further comprising:
   receiving a tone map reply (TMREP) from the receiving device; and
   updating a TMREQ age table for each subcarrier of the one or more unused quality subcarriers.

9. The method as in claim 8, comprising:
   aging each TMREQ age table; and
   determining whether a TMREQ age table for a particular subcarrier has expired based on comparison to a maximum age.

10. The method as in claim 9, further comprising:
    dynamically adjusting the maximum age of a particular TMREQ age table for a particular subcarrier based on a condition selected from the group consisting of: observed properties of the particular subcarrier and interference; application requirements on the responsiveness of reacting to changes in subcarrier quality; and feedback.

11. The method as in claim 9, comprising:
    transmitting a TMREQ for the particular subcarrier in response to the TMREQ age table having expired for the particular subcarrier.

12. A method, comprising:
    receiving, from a source device, a data frame on a particular subcarrier;
    determining if the data frame serves a tone map request (TMREQ) data frame;
    evaluating transmission quality of one or more unused quality subcarriers based on the well-known bit sequence if the data frame is a TMREQ, wherein the TMREQ data frame indentifying a use of each subcarrier during transmission; and
    transmitting a tone map reply (TMREP) to the source device in response to the TMREQ.

13. An apparatus, comprising:
    one or more network interfaces adapted to communicate in a computer network;
    a processor coupled to the network interfaces and adapted to execute one or more processes; and
    a memory configured to store a process executable by the processor, the process when executed operable to:
      select, based on an optimal tone map, a particular subcarrier for use when transmitting a data frame, the data frame to serve as a tone map request (TMREQ) data frame;
      populate one or more unused quality subcarriers of the TMREQ data frame other than the particular subcarrier with a well-known bit sequence,
    wherein the TMREQ data frame indentifying a use of each subcarrier during transmission; and
      transmit the TMREQ data frame to a receiving device to cause the receiving device to evaluate transmission quality of the one or more unused quality subcarriers based on the well-known bit sequence.

14. The apparatus as in claim 13, wherein the process when executed is further operable to:
    receive a tone map reply (TMREP) from the receiving device on the particular subcarrier.

15. The apparatus as in claim 13, wherein the process when executed is further operable to:
    augment a header of the TMREQ data frame with a subcarrier description field.

16. The apparatus as in claim 15, wherein the subcarrier description field is augmented by a two-bit field for each subcarrier to indicate the use of the subcarrier in the particular transmission.

17. The apparatus as in claim 13, wherein the process when executed is further operable to:
    alter a code-rate of the data frame to adjust an amount of redundant information included in the well-known bit sequence.

18. The apparatus as in claim 13, wherein the process when executed is further operable to:
    receive a tone map reply (TMREP) from the receiving device; and
    update a TMREQ age table for each subcarrier of the one or more unused quality subcarriers.

19. The apparatus as in claim 18, wherein the process when executed is further operable to:
- age each TMREQ age table;
- determine whether a TMREQ age table for a particular subcarrier has expired based on comparison to a maximum age; and
- transmit a TMREQ for the particular subcarrier in response to the TMREQ age table having expired for the particular subcarrier.

20. The apparatus as in claim 18, wherein the process when executed is further operable to:
- dynamically adjust the maximum age of a particular TMREQ age table for a particular subcarrier.

21. An apparatus, comprising:
- one or more network interfaces adapted to communicate in a computer network;
- a processor coupled to the network interfaces and adapted to execute one or more processes; and
- a memory configured to store a process executable by the processor, the process when executed operable to:
  - receive, from a source device, a data frame on a particular subcarrier;
  - determine if the data frame serves a tone map request (TMREQ) data frame;
  - evaluate transmission quality of one or more unused quality subcarriers based on the well-known bit sequence if the data frame is a TMREQ, wherein the TMREQ data frame indentifying a use of each subcarrier during transmission; and
  - transmit a tone map reply (TMREP) to the source device in response to the TMREQ.

* * * * *